Patented Nov. 27, 1951

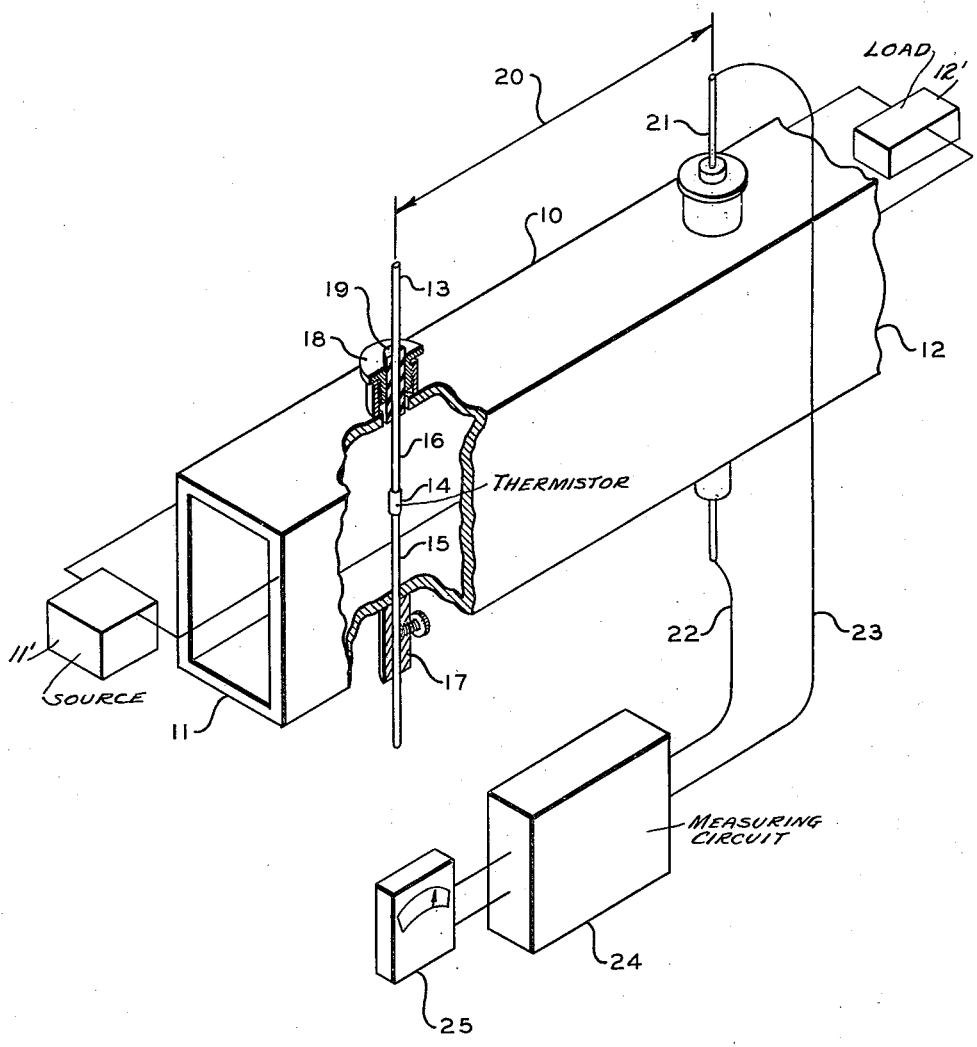

2,576,344

UNITED STATES PATENT OFFICE 2,576,344

MICROWAVE WATTMETER FOR WAVE GUIDES

Robert A. Howard, Pasadena, Calif., assignor, by mesne assignments, to the United States of America as represented by the Secretary of the Navy Application March 5, 1946, Serial No. 652,194

5 Claims. (Cl. 171—95)

This invention relates to power measurement at high radio frequencies and more particularly to the monitoring and measurement of high power levels in wave guides.

Present systems for measurement of power in the high radio frequencies involve dissipation of the power in some medium which is equipped with a device to measure the heating due to the dissipated power. Such systems are satisfactory where a single power determination is desired or where only relatively low power levels are involved. The systems involve dissipation of all or a considerable percentage of the total power and thus, are unsatisfactory for continuous monitoring or measurement of high power levels.

The object of the present invention is to provide a power meter for continuous monitoring of the power level in a radio frequency system.

An additional object is to provide a radio frequency wattmeter operating from a very small percentage of the total power.

These and other objects may be better understood from the following description when taken in conjunction with the accompanying drawing, the single figure of which shows a radio frequency power meter embodying this invention.

In a microwave system employing a waveguide to transmit the power from the source to the load, proper matching of the impedance of the load to the waveguide will result in the load absorbing all the power transmitted through the waveguide. The power transmitted through the waveguide will be evidenced by the magnitude of the magnetic and electrical fields existing within the waveguide. If a temperature sensitive resistor is placed in the waveguide, it will intercept the fields and absorb some of the power being transmitted. The fraction of the total power absorbed by the resistor will depend upon the orientation of the resistor within the waveguide, but in any position it will be a definite percentage of the total power.

The power dissipation in the temperature sensitive resistor will result in a rise in temperature. The resistor used may be a thermistor, the temperature sensitive element of which is a composition including nickel, cobalt, and manganese. When the temperature of thermistor is raised, the resistance decreases approximately exponentially. Thus, if a thermistor is used as the temperature sensitive resistor as described above, a power indication may be obtained from the resistance change of the thermistor. This resistance change may be measured by any of several known means, preferably a Wheatstone bridge circuit.

As usually constructed, the thermistor consists of a bead of the temperature sensitive material with two conducting wire leads connected to opposite sides of the bead. If the thermistor is supported in the waveguide by means of the wire leads, the leads will intercept some of the fields and conduct the power to the bead. To reduce this pickup by the leads, the leads may be oriented in the waveguide so as to be perpendicular to the vector of the electric field. This may be most easily done in a rectangular waveguide operating in the $TE_{01}$ mode by mounting the thermistor with the connecting wire leads parallel to the broad dimension of the waveguide. A thermistor mounted in this manner will absorb approximately one one-thousandth of the total power.

When an obstruction such as the thermistor, described above, is placed in a waveguide, reflections will occur setting up standing waves within the waveguide. The standing waves modify the field conditions within the guide and would lead to erroneous power measurements. Reflections can be neutralized in this case by placing two identical thermistors across the waveguide separated by a distance of approximately a quarter wavelength. The reflection from the two thermistors will then be 180° out of phase and will cancel each other. Any odd multiple of a quarter wavelength can be used. Actually 0.24 wavelength was found to be very satisfactory.

Referring to the accompanying drawing, a section of rectangular waveguide 10 is shown. The waveguide 10 is connected at 11 to a source 11' of electromagnetic energy and at the other end 12 to a matched load 12'. A thermistor 13 comprising a temperature sensitive resistor 14 and two conducting wires 15 and 16 is mounted transversely in the waveguide 10 parallel to the wide dimension. The lower conducting wire 15 is clamped by mounting 17, making conductive contact to the waveguide 10. The upper conducting wire 16 passes through mounting 18 being insulated therefrom by suitable insulating material 19. At a distance 20 measured parallel to the axis of waveguide 10 is a second similar thermistor 21. The distance 20 is slightly less than a quarter wavelength, or any odd multiple of a quarter wavelength. Thermistor 21 is mounted with a mounting identical to thermistor 13.

Connected to the conducting wires of thermistor 21 are two conducting leads 22 and 23. Leads 22 and 23 connect to a resistance measuring circuit 24 for example, preferably a Wheatstone bridge having an indicating meter 25. Meter 25 may be calibrated to read directly in terms of the power in waveguide 10.

It is unnecessary to connect a second measuring circuit to leads 15 and 16 of thermistor 13 since the output of this measuring circuit would merely duplicate the data provided by measuring circuit 24. The extension of the leads outside the waveguide permit lateral adjustment of the temperature sensitive resistor within the waveguide. However, since the wires supporting the temperature sensitive resistors do not carry radio frequency current the length of these supporting wires is immaterial.

It is to be understood that this invention is not limited to the details of construction illustrated in the accompanying drawing and described above, except as appears hereafter in the claims.

What is claimed is:

1. A radio frequency power measuring system comprising, a rectangular wave-guide, a source of electromagnetic energy, a load, said waveguide conducting said electromagnetic energy from said source to said load, said load being substantially matched to said waveguide to produce a minimum of reflections, a temperature sensitive resistor having two conducting leads, said resistor mounted in the center of a transverse secton of said waveguide, said resistor supported in said waveguide by said conducting leads, said leads extending substantially parallel to the broad dimension of said waveguide and extending through the walls of said waveguide, one of said leads being insulated from said waveguide, and a means for measuring a resistance change connected to said resistor through said leads.

2. A radio frequency wattmeter comprising, a waveguide, a source of electromagnetic energy, a load, said waveguide conducting the electromagnetic energy from said source to said load, said load being substantially matched to said waveguide, a first temperature sensitive resistor transversely mounted in said waveguide, a means for measuring a resistance change of said resistor, and a second temperature sensitive resistor mounted similarly to first resistor in said waveguide, said second resistor being mounted at a distance from said first resistor substantially equal to an odd number of quarter wavelengths, said distance measured along the length of said waveguide.

3. A radio frequency power measuring system comprising, a rectangular waveguide, a source of electromagnetic energy, a load, said waveguide conducting said electromagnetic energy from said source to said load, said load being substantially matched to said waveguide to produce a minimum of reflections, a first temperature sensitive resistor having two conducting leads, said first resistor mounted in the center of a transverse section of said waveguide, said resistor being supported in said waveguide by said conducting leads, said leads extending substantially parallel to the broad dimension of said waveguide and extending through the walls of said waveguide, means insulating one of said leads from said waveguide, a resistance bridge adapted to measure changes in resistance connected to said first temperature sensitive resistor, an indicating instrument responsive to said resistance bridge for indicating the power in said waveguide, and a second temperature sensitive resistor, said second resistor mounted similarly to said first resistor in said waveguide, said second resistor being mounted at a distance from said first resistor substantially equal to an odd number of quarter wavelengths of the electromagnetic energy within the waveguide, said distance measured along the length of said waveguide.

4. A radio frequency power measuring system comprising, a rectangular wave guide, a source of electromagnetic energy, a load, said wave guide conducting said electromagnetic energy from said source to said load, said wave guide being dimensioned to conduct said electromagnetic energy only in the dominant mode, said load being substantially matched to said wave guide to produce a minimum of reflections, a first temperature sensitive resistor having two conducting leads, said first resistor being mounted in the center of a transverse section of said wave guide, said resistor being supported in said wave guide by said conducting leads, said leads extending substantially parallel to the broad dimension of said wave guide and extending through the walls of said wave guide, means insulating one of said leads from said wave guide, a resistance bridge connected to said first temperature sensitive resistor and adapted to measure changes in resistance of said first temperature sensitive resistor, an indicating instrument responsive to said resistance bridge for indicating the power level in said wave guide, and a second temperature sensitive resistor, said second resistor being mounted similarly to said first resistor in said wave guide, said second resistor being mounted at a distance from said first resistor of substantially an odd number of quarter wave lengths of the electromagnetic energy within the wave guide, said distance being measured along the longitudinal axis of said wave guide.

5. A radio frequency power measuring system comprising, a rectangular wave guide, a source of electromagnetic energy, a load, said wave guide conducting said electromagnetic energy from said source to said load, said load being substantially matched to said wave guide to produce a minimum of reflections, a first temperature sensitive resistor having two conducting leads, said first resistor being mounted in a transverse section of said wave guide, said first resistor being adjustable in position transversely of said wave guide, said resistor being supported in said wave guide by said conducting leads, said leads extending substantially perpendicular to the direction of the electric field within said wave guide and extending through the walls of said wave guide, means insulating one of said leads from said wave guide, a resistance bridge connected to said first temperature sensitive resistor and adapted to measure changes in resistance of said first temperature sensitive resistor, an indicating instrument responsive to said resistance bridge for indicating the power level in said wave guide, and a second temperature sensitive resistor, said second resistor being mounted similarly to said first resistor in said wave guide, said second resistor being mounted at a distance from said first resistor of substantially an odd number of quarter wave lengths of the electromagnetic energy within the wave guide, said distance being measured along the longitudinal axis of said wave guide.

ROBERT A. HOWARD.

REFERENCES CITED

The following references are of record in the file of this patent:

UNITED STATES PATENTS

| Number | Name | Date |
|---|---|---|
| Re. 23,131 | Webber | June 28, 1949 |
| 1,590,420 | Chubb | June 29, 1926 |
| 2,151,157 | Schelkunoff | Mar. 21, 1939 |
| 2,232,179 | King | Feb. 18, 1941 |
| 2,337,612 | Linder | Dec. 28, 1943 |
| 2,375,223 | Hansen | May 8, 1945 |
| 2,399,674 | Harrison | May 7, 1946 |
| 2,427,094 | Evans | Sept. 9, 1947 |
| 2,495,752 | Montgomery | Jan. 31, 1950 |